June 26, 1945.   G. E. FALLESEN ET AL   2,378,917
SENSITIZED PHOTOGRAPHIC EMULSION
Filed Nov. 4, 1942
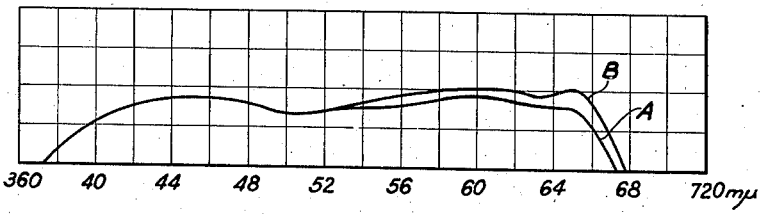
A-GELATINO-SILVER-BROMIODIDE EMULSION SENSITIZED WITH
  3,3'-DIETHYL-9-METHYL-SELENACARBOCYANINE BROMIDE.
B-SAME EMULSION AS REPRESENTED BY CURVE A WITH
  METHYL ANTHRANILATE ADDED.
GEORGE E. FALLESEN
JOHN A. LEERMAKERS
         INVENTORS
BY
         ATTORNEYS Patented June 26, 1945

2,378,917

UNITED STATES PATENT OFFICE 2,378,917

SENSITIZED PHOTOGRAPHIC EMULSION

George E. Fallesen and John A. Leermakers, Rochester, N. Y., assignors to Eastman Kodak Company, Rochester, N. Y., a corporation of New Jersey Application November 4, 1942, Serial No. 464,443

15 Claims. (Cl. 95—7)

This invention relates to sensitized photographic emulsions and more particularly to spectrally sensitized photographic emulsions.

It is known that the sensitivity of spectrally sensitized emulsions can be increased by altering conditions in the emulsion, e.g. by increasing the silver ion concentration or by decreasing the hydrogen ion concentration or both. Such a method for increasing sensitivity is usually referred to as hypersensitization and can be accomplished by bathing the emulsions in water or solutions of ammonia. It is also known that the distribution of spectral sensitivity of certain spectrally sensitized emulsions can be altered and an increase of sensitivity obtained in some spectral region, by incorporating certain additional sensitizing dyes in the spectrally sensitized emulsion. In such latter cases, the effect is greater than a mere addition of the sensitivities which can be obtained with the several sensitizing dyes separately and has come to be known as supersensitization (in contrast with hypersensitization), since no appreciable change in silver or hydrogen ion concentration takes place in the emulsion.

We have now found that the distribution of spectral sensitivity of certain spectrally sensitized emulsions can be modified, usually with an increase in sensitivity in some spectral region, by incorporating carboxylic esters containing an aromatic nucleus, in the spectrally sensitized emulsions. Our new method may be regarded as a kind of supersensitization.

It is accordingly an object of our invention to provide sensitized photographic emulsions. A further object is to provide a process for preparing such emulsions. Other objects will become apparent hereinafter.

The spectrally sensitized emulsions which we employ in practicing our invention are those which are sensitized with one or more cyanine dyes, especially those selected from the group consisting of simple (monomethine) cyanine dyes and carbo (trimethine) cyanine dyes. Spectrally sensitized emulsions sensitized with a supersensitizing (see above) combination of such sensitizing dyes may be employed in practicing our invention. Generally speaking, the most pronounced effects have been obtained with cyanine dyes of the following groups:

thiacarbocyanine dyes of the general formula:

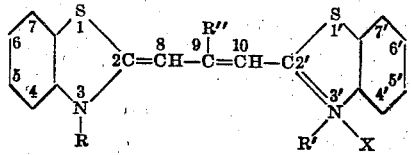

selenacarbocyanine dyes of the general formula:

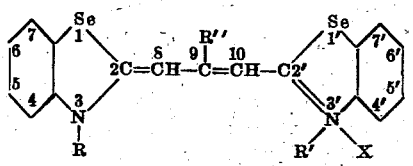

thiaselenacarbocyanine dyes of the general formula:

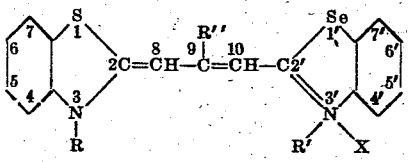

oxathiacarbocyanine dyes of the general formula:

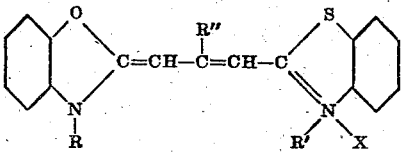

oxaselenacarbocyanine dyes of the general formula:

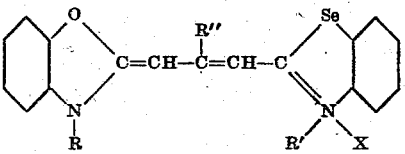

In the above general formulas, R and R' represent alkyl groups while R" represents either hydrogen or alkyl groups. X represents an acid radical. Those dyes in which R and R' each represent an alkyl group of the formula $C_nH_{2n+1}$ wherein $n$ represents a positive integer of from 1 to 4 and R" represents an alkyl group of the same formula wherein $n$ represents a positive integer of from 1 to 2 are especially useful in practicing our invention. The benzene nuclei in the above general formulas may carry simple substituents such as chlorine, alkyl, alkoxyl or dialkyl amino and may also carry fused-on benzene rings.

The aromatic carboxylic esters which we employ are carboxylic esters containing an aromatic nucleus. Such esters can be divided into eight main sub-groups, to wit:

| | R—O—C(=O)—R' | | Example |
|---|---|---|---|
| | R | R' | |
| 1 | Aryl | Aryl | o-Cresyl benzoate. |
| 2 | do | Alkyl | Guaiacyl acetate. |
| 3 | do | Aralkyl | Guaiacyl phenylacetate. |
| 4 | Alkyl | Aryl | Ethyl benzoate. |
| 5 | do | Aralkyl | Methyl phenylacetate. |
| 6 | Aralkyl | do | Benzyl phenylacetate. |
| 7 | do | Aryl | Benzyl benzoate. |
| 8 | do | Alkyl | Benzyl acetate. |

Among the esters of type 1, those containing o-cresyl radicals are highly efficacious.

Among the esters of type 4, those containing methyl and ethyl alcohol radicals are especially efficacious. Among esters containing higher alcohol radicals, the efficacy decreases rapidly with molecular weight. Esters of type 4 containing benzoic acid, salicylic acid (o-hydroxy benzoic acid), anisic acid (p-methoxybenzoic acid) and anthranilic acid (o-amino-benzoic acid) radicals are especially efficacious. Monocarboxylic esters are advantageously employed.

The aromatic esters are advantageously incorporated in the emulsions in the form of methyl alcoholic solutions. Ethyl alcohol or acetone can also be employed. The esters should be thoroughly distributed throughout the emulsion. The esters can be incorporated in the emulsion during its preparation, e. g., with gelatin at the beginning of the digestion period, or the esters can be incorporated in the washed, finished emulsions just prior to coating. The quantity of ester which gives the maximum effect will, of course, vary with the nature of the ester and with the type of emulsion. Ordinarily the effect of the esters appears to increase with concentration up to a certain point beyond which no further effect is obtained. The effective concentration of the ester is apparently considerably dependent upon the solubility of the ester in the emulsion system. When the ester is incorporated in the emulsion during the preparation of the emulsion, the most effective concentration usually lies between about 1 gram and about 50 grams of ester per gram-mole of silver halide in the emulsion. When the ester is added to the emulsion just prior to coating, the most effective concentration of ester usually lies between about 0.5 gram to about 20 grams per gram-mole of silver halide in the emulsion. The optimum concentration for any particular ester can be readily determined by examining the effect of a series of different concentration.

The efficacy of any ester can usually be conveniently determined in the following way: The ester, dissolved in the minimum amount of methyl or ethyl alcohol or acetone is added to an aqueous gelatin solution (70 g. of gelatin per 1000 g. of water) and the resulting dispersion is coated on a glass plate. When dry the coated plate is examined for optical homogeneity. The effective esters all give optically homogeneous gels in concentrations of the order of about 7 to about 20 grams per 100 grams of gelatin; outside this range of solubility, the efficacy of the esters falls off very rapidly.

The aromatic ester can be incorporated in the emulsion before, simultaneously with or after the sensitizing dye. The method of incorporating sensitizing dyes in photographic emulsions are, of course, well known to those skilled in the art. Ordinarily, the dyes are advantageously incorporated in the emulsions in the form of methyl alcoholic solutions. Acetone or ethyl alcohol may be employed where the solubility of the sensitizing dye is low in methyl alcohol. The sensitizing dye is advantageously employed in its optimum concentration. Frequently, the optimum concentration (at which greatest sensitivity is conferred) of a sensitizing dye is within the range. 10 mg. to 30 mg., of dye per liter of emulsion containing about 0.25 gram-mole of silver halide.

In emulsions spectrally sensitized with many sensitizing dyes, a change in the distribution of spectral sensitivity is obtained and this change always takes the form of an increase in relative sensitivity for the longer wavelengths. The changes in distribution of spectral sensitivity may occur even though a sensitizing combination of sensitizing dyes is involved; for example, the combinations of 3,3'-dialkyl-9-alkyl thiacarbocyanines with 2'-cyanines (see U. S. Patent No. 2,158,882, dated May 16, 1939).

To prepare an emulsion sensitized in accordance with our invention, the following procedure is satisfactory: into one liter of a flowable gelatino silver halide emulsion containing about 0.23 gram-mole of silver halide is added with stirring a methyl alcoholic solution of a sensitizing dye. The dye is thoroughly dispersed throughout the emulsion. To the resulting sensitized emulsion is then added with stirring a methyl alcoholic solution of one of our aromatic esters. The ester is thoroughly dispersed throughout the emulsion. The resulting emulsion can then be coated, dried and exposed in the usual manner.

The following tabulation contains data which illustrate the useful effects obtained in accordance with our invention:

TABLE I

*High speed gelatino-silver-bromiodide emulsion of the neutral type containing about 0.25 gram-mole of silver halide per liter, sensitized with 3,3'-diethyl-9-methylselenacarbocyanine bromide (about 30 mg. per liter of emulsion). Aromatic ester added to the emulsion with gelatin at beginning of digestion period immediately after the precipitation of the silver halide*

| Aromatic ester (g. per gram-mole of silver halide) | Clear speed / Clear speed of control | Gamma / Gamma of control | Fog / Fog of control | Red speed / Red speed of control | Development |
|---|---|---|---|---|---|
| Benzyl benzoate, 50 g | 1.30 | 0.96 | .09/.10 | 1.15 | 3 min. "D-19." |
| Benzyl salicylate, 50 g | 1.09 | 1.05 | .11/.10 | 1.13 | Do. |
| Ethyl benzoate, 50 g | 1.07 | 0.94 | .08/.08 | 1.11 | Do. |
| Ethyl benzoyl benzoate, 50 g | 0.97 | 0.84 | .07/.08 | 1.43 | Do. |
| Ethyl cinnamate, 50 g | 1.16 | 0.90 | .08/.08 | 1.26 | Do. |
| Ethyl phenyl acetate, 50 g | 1.07 | 0.86 | .06/.08 | 1.24 | Do. |
| Eugenol acetates, 50 g | 1.27 | 0.89 | .15/.12 | 1.32 | 8 min. "D-19." |
| Guaiacol acetate, 50 g | 1.30 | 0.84 | .11/.12 | 1.15 | Do. |

TABLE II

*High speed gelatino-silver-bromiodide emulsion of the neutral type containing about 0.25 gram-mole of silver halide per liter, sensitized with 3,3'-diethyl-9-methylselenacarbocyanine bromide (about 20 or about 30 mg. per liter of emulsion, as indicated). Aromatic ester added to the washed, finished emulsion just before coating*

| Aromatic ester (g. per gram-mole of silver halide) | Clear speed / Clear speed of control | Gamma / Gamma of control | Fog / Fog of control | Red speed / Red speed of control | Development |
|---|---|---|---|---|---|
| Methyl anthranilate, 20 g | 1.40 | 1.06 | .05/.06 | 1.67 | 3 min. "D-19." [2] |
| Methyl salicylate, 15 g | 0.98 | 0.95 | .18/.17 | 2.39 | Do.[1] |
| Methyl-3-hydroxy-2-naphthoate, 15 g | 1.44 | 0.96 | .07/.05 | 1.48. | Do.[1] |
| Ethyl benzoate, 7.5 g | 1.17 | 0.88 | .10/.10 | 2.34 | 9 min. borax.[1] |
| Methyl benzoate, 7.5 g | .97 | 1.11 | .06/.05 | 1.38 | 3 min. "D-19". [1] |
| Phenyl acetate, 15 g | 1.01 | 0.98 | .04/.05 | 1.30 | Do.[1] |
| Eugenol acetate, 15 g | 1.00 | 0.99 | .14/.04 | 1.44 | Do.[1] |
| o-Cresyl benzoate, 15 g | 1.03 | 1.03 | .05/.04 | 1.72 | Do.[1] |
| Benzyl salicylate, 15 g | 1.01 | 1.02 | .05/.04 | 1.51 | Do.[1] |
| Benzyl benzoate, 15 g | 1.07 | 1.00 | .05/.04 | 1.91 | Do.[1] |
| Guaiacol acetate, 15 g | 1.00 | 1.06 | .05/.04 | 1.40 | Do.[1] |
| Phenyl trichloro methyl carbinol acetate, 8 g | 0.90 | 0.94 | .05/.04 | 0.84 | 9 min. borax. [1] |
| Methyl-p-dimethyl-amino benzoate, 5 g | 0.69 | 0.96 | .05/.05 | 1.62 | 3 min. "D-19."[1] |
| Methyl-m-methoxy benzoate, 5 g | 0.74 | 0.90 | .05/.05 | [3] 0.95 | Do.[3] |

[1] 30 mg. of sensitizing dye per liter of emulsion.
[2] 20 mg. of sensitizing dye per liter of emulsion.
[3] Red maximum shift, no increase in red speed.

The accompanying drawing demonstrates diagrammatically how our esters alter the distribution of spectral sensitivity. Curve A shows the sensitivity of a high-speed gelatino-silver-bromiodide emulsion sensitized with 3,3'-diethyl-9-methyl selenacarbocyanine bromide. Curve B shows the same emulsion to which methyl anthranilate has been added. The shift of maximum sensitivity to the longer wavelengths is clearly apparent.

Our invention is primarily directed to the customarily employed gelatino-silver-halide developing-out emulsions for development to black-and-white images, such as gelatino-silver-chloride, gelatino-silver-chlorobromide, gelatino-silver-bromide and gelatino-silver bromiodide developing-out emulsions. However, silver halide emulsions in which the carrier is other than gelatin, e. g. a cellulose derivative or a resinous material, can also be employed.

Emulsions prepared in accordance with our invention can be coated in the usual manner upon any desired support such as cellulose nitrate support, cellulose acetate support, polyvinyl acetal resin support, glass support, metal support or paper support.

What we claim as our invention and desire to be secured by Letters Patent of the United States is:

1. A photographic silver halide emulsion spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

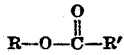

wherein R and R' each represents a member selected from the group consisting of alkyl, aralkyl and aryl groups, except that R and R' do not both represent alkyl at the same time.

2. A photographic silver halide developing-out emulsion spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

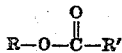

wherein R and R' each represents a member selected from the group consisting of alkyl, aralkyl and aryl groups, except that R and R' do not both represent alkyl at the same time.

3. A photographic gelatino-silver-halide developing-out emulsion spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

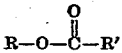

wherein R and R' each represents a member selected from the group consisting of alkyl, aralkyl and aryl groups, except that R and R' do not both represent alkyl at the same time.

4. A photographic gelatino-silver-halide developing-out emulsion spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

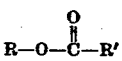

wherein R and R' each represents a member selected from the group consisting of alkyl, aralkyl and aryl groups, except that R and R' do not both represent alkyl at the same time, said ester having a solubility in gelatin of from about 7 to about 20 grams of ester per 100 grams of gelatin.

5. A photographic gelatino-silver-halide developing-out emulsion spectrally sensitized with a cyanide dye selected from the group consisting of monomethine and trimethine cyanine dyes, the emulsion containing in contact with the silver-halide grains, to modify the spectral sensitivity of the emulsion, at least one aromatic ester selected from those which are represented by the following general formula:

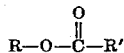

wherein R and R' each represents a member selected from the group consisting of alkyl groups, aralkyl groups of the benzene series and aryl groups of the benzene series, except that R and R' do not both represent alkyl at the same time, said ester having a solubility in gelatin of from about 7 to about 20 grams of ester per 100 grams of gelatin.

6. A photographic gelatino-silver-halide developing-out emulsion for development to black-and-white images spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

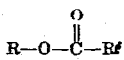

wherein R and R' each represents an aryl group of the benzene series, said ester having a solubility in gelatin of from about 7 to about 20 grams of ester per 100 grams of gelatin.

7. A photographic gelatino-silver-halide developing-out emulsion for development to black-and-white images spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

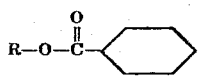

wherein R represents an aryl group of the benzene series, said ester having a solubility in gelatin of from about 7 to about 20 grams of ester per 100 grams of gelatin.

8. A photographic gelatino-silver-halide developing-out emulsion for development to black-and-white images spectrally sensitized with a cyanine dye selected from the group consisting of monomethine and trimethine cyanine dyes, the emulsion containing in contact with the silver halide grains, to modify the spectral sensitivity of the emulsion, o-cresyl benzoate.

9. A photographic gelatino-silver-halide developing-out emulsion for development to black-and-white images spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following formula:

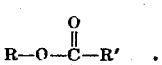

wherein R represents a group of the formula $C_nH_{2n+1}$ wherein $n$ represents a positive integer of from 1 to 2, and R' represents an aryl group of the benzene series, said ester having a solubility in gelatin of from about 7 to about 20 grams of ester per 100 grams of gelatin.

10. A photographic gelatino-silver-halide developing-out emulsion for development to black-and-white images spectrally sensitized with a cyanine dye selected from the group consisting of monomethine and trimethine dyes, the emulsion containing in contact with the silver halide grains, to modify the spectral sensitivity of the emulsion, at least one aromatic ester selected from those which are represented by the following general formula:

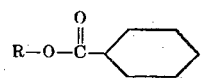

wherein R represents a group of the formula $C_nH_{2n+1}$ wherein $n$ represents a positive integer of from 1 to 2.

11. A photographic gelatino-silver-halide developing-out emulsion for development to black-and-white images spectrally sensitized with a cyanine dye selected from the group consisting of monomethine and trimethine cyanine dyes, the emulsion containing in contact with the silver halide grains, to modify the spectral sensitivity of the emulsion, at least one aromatic ester selected from those which are represented by the following general formula:

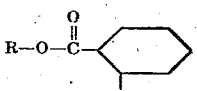

wherein R represents a group of the formula $C_nH_{2n+1}$ wherein $n$ represents a positive integer of from 1 to 2.

12. A photographic gelatino-silver-halide developing-out emulsion for development to black-and-white images spectrally sensitized with a cyanine dye selected from the group consisting of thiacarbocyanine dyes, selenacarbocyanine dyes, thiaselenacarbocyanine dyes, oxathiacarbocyanine dyes and oxaselenacarbocyanine dyes, the emulsion containing, in contact with the silver halide grains, to modify the spectral sensitivity of the emulsion, at least one aromatic ester selected from those which are represented by the following general formula:

wherein R and R' each represents a member selected from the group consisting of alkyl groups, aralkyl groups of the benzene series and aryl groups of the benzene series, except that R and R' do not both represent alkyl at the same time, said ester having a solubility in gelatin of from about 7 to about 20 grams of ester per 100 grams of gelatin.

13. A photographic gelatino-silver-halide developing-out emulsion for development to black-and-white images spectrally sensitized with a cyanine dye selected from the group consisting of 3,3'-dialkylthiacarbocyanine dyes, 3,3'-dialkylselenacarbocyanine dyes, 3,3'-dialkylthiaselenacarbocyanine dyes, 3,3'-dialkyloxathiacarbocyanine dyes and 3,3'-dialkyloxaselenacarbocyanine dyes in which the alkyl groups are of the formula $C_nH_{2n+1}$ wherein $n$ represents a positive integer of from 1 to 4, the emulsion containing in contact with silver halide grains, to modify the spectral sensitivity of the emulsion, at least one aromatic ester selected from those which are represented by the following general formula:

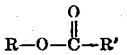

wherein R and R' each represents a member selected from the group consisting of alkyl groups, aralkyl groups of the benzene series and aryl groups of the benzene series, except that R and R' do not both represent alkyl at the same time, said ester having a solubility in gelatin of from about 7 to about 20 grams of ester per 100 grams of gelatin.

14. A photographic gelatino-silver-halide developing-out emulsion for development to black-and-white images spectrally sensitized with a cyanine dye selected from the group consisting of 3,3'-dialkyl-9-alkylthiacarbocyanine dyes, 3,3'-dialkyl-9-alkylselenacarbocyanine dyes, 3,3'-dialkyl-9-alkyloxathiacarbocyanine dyes and 3,3'-dialkyl-9-alkyloxaselenacarbocyanine dyes in which the 3- and 3'-alkyl groups are of the formula $C_nH_{2n+1}$ wherein $n$ represents a positive integer of from 1 to 4, and the 9-alkyl groups are of the formula $C_nH_{2n+1}$ wherein $n$ represents a postive integer of from 1 to 2, the emulsion containing in contact with the silver halide grains, to modify the spectral sensitivity of the emulsion, at least one aromatic ester selected from those which are represented by the gollowing general formula:

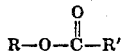

wherein R and R' each represents a member selected from the group consisting of alkyl groups, aralkyl groups of the benzene series and aryl groups of the benzene series, except that R and R' do not both represent alkyl at the same time, said ester having a solubility in gelatin of from about 7 to about 20 grams of ester per 100 grams of gelatin.

15. A photographic gelatino-silver-halide developing-out emulsion for development to black-and-white images spectrally sensitized with a cyanine dye selected from the group consisting of 3,3'-dialkyl-9-alkylthiacarbocyanine dyes, 3,3'-dialkyl-9-alkylselenacarbocyanine dyes, 3,3'-dialkyl-9-alkyloxathiacarbocyanine dyes and 3,3'-dialkyl-9-alkyloxaselenacarbocyanine dyes in which the 3- and 3'-alkyl groups are of the formula $C_nH_{2n+1}$ wherein $n$ represents a positive integer of from 1 to 4, and the 9-alkyl groups are of the formula $C_nH_{2n+1}$ wherein $n$ represents a positive integer of from 1 to 2, the emulsion containing in contact with the silver halide grains, to modify the spectral sensitivity of the emulsion, at least one aromatic ester selected from those which are represented by the following general formula:

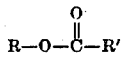

wherein R and R' each represents an aryl group of the benzene series, said ester having a solubility in gelatin of from about 7 to about 20 grams of ester per 100 grams of gelatin.

GEORGE E. FALLESEN.
JOHN A. LEERMAKERS.